United States Patent
He et al.

(10) Patent No.: US 11,565,349 B2
(45) Date of Patent: Jan. 31, 2023

(54) COMPOSITE DEVICE FOR HIGH-PRECISION LASER ADDITIVE/SUBTRACTIVE MANUFACTURING

(71) Applicant: Shanghai University Of Engineering Science, Shanghai (CN)

(72) Inventors: Bo He, Shanghai (CN); Shuang Gao, Shanghai (CN); Liang Lan, Shanghai (CN); Zhijun Tan, Shanghai (CN); Qi Zhang, Jinzhong (CN)

(73) Assignee: SHANGHAI UNIVERSITY OF ENGINEERING SCIENCE, Shanghai (CN)

( * ) Notice: Subject to any disclaimer, the term of this patent is extended or adjusted under 35 U.S.C. 154(b) by 71 days.

(21) Appl. No.: 17/235,701

(22) Filed: Apr. 20, 2021

(65) Prior Publication Data

US 2022/0009033 A1    Jan. 13, 2022

(30) Foreign Application Priority Data

Jul. 7, 2020    (CN) .......................... 202010646377.X

(51) Int. Cl.
*B23K 26/34* (2014.01)
*B33Y 30/00* (2015.01)
(Continued)

(52) U.S. Cl.
CPC .............. *B23K 26/34* (2013.01); *B22F 12/43* (2021.01); *B23K 26/354* (2015.10); *B33Y 30/00* (2014.12)

(58) Field of Classification Search
CPC ......... B33Y 30/00; B33Y 10/00; B33Y 50/02; B33Y 40/00; B33Y 70/00; B33Y 80/00;
(Continued)

(56) References Cited

U.S. PATENT DOCUMENTS

2010/0012630 A1 *  1/2010  Leuterer ................ B33Y 40/00
                                                       219/121.65
2010/0196192 A1 *  8/2010  Liu ........................... B22F 9/04
                                                          420/466

(Continued)

FOREIGN PATENT DOCUMENTS

| CN | 106346006 B   | * | 5/2019 |
| CN | 110369725 A   | * | 10/2019 |
| WO | WO-2017143789 A1 | * | 8/2017 |

OTHER PUBLICATIONS

English translation of WO-2017143789-A1 (Year: 2017).*
English translation of CN-106346006-B (Year: 2019).*
English translation of CN-110369725-A (Year: 2019).*

*Primary Examiner* — Chris Q Liu
(74) *Attorney, Agent, or Firm* — WPAT, PC

(57) ABSTRACT

The present invention discloses a composite device for high-precision laser additive/subtractive manufacturing, which consists of a sealed shaping chamber, an inert protective gas source and a machine-shaping platform; wherein, the inert protective gas source is connected to the sealed shaping chamber; and the machine-shaping platform is arranged in the sealed shaping chamber, as well as there is a light path selection system is arranged right above the machine-shaping platform; in addition, there is a machining position is equipped on the machine-shaping platform, meanwhile, there are lead screws are arranged under the machine-shaping platform.

7 Claims, 2 Drawing Sheets

(51) Int. Cl.
*B23K 26/354* (2014.01)
*B22F 12/43* (2021.01)

(58) Field of Classification Search
CPC .............. B23K 26/342; B23K 26/082; B23K 15/0086; B23K 2103/14; B23K 26/046; B23K 26/0622; B23K 26/1224; B23K 26/34; B23K 26/354; B23K 26/702; B23K 15/002; B23K 15/004; B23K 15/06; B23K 2101/001; B23K 2103/04; B23K 2103/05; B23K 2103/10; B23K 2103/12; B23K 26/03; B23K 26/032; B23K 26/034; B23K 26/04; B23K 26/0626; B23K 26/064; B23K 26/0643; B23K 26/0648; B23K 26/08; B23K 26/0869; B23K 26/0876; B23K 26/144; B23K 26/1462; B23K 26/21; B23K 26/38; B23K 35/0244; B23K 37/06; B23K 26/703; B23K 26/36; B23K 2013/14; B23K 26/0624; B23K 26/083; B23K 26/126; B23K 26/127; B23K 20/008; B23K 2103/50; B23K 2103/52; B23K 26/0006; B23K 26/073; B23K 26/0821; B23K 26/122; B23K 26/123; B23K 26/14; B23K 26/142; B23K 26/16; B23K 26/26; B23K 26/32; B23K 26/362; B23K 26/364
USPC ....................................................... 219/121.65
See application file for complete search history.

(56) References Cited

U.S. PATENT DOCUMENTS

2012/0225568 A1\* 9/2012 Izawa ............... H01L 21/02126
   257/E21.328
2014/0363585 A1\* 12/2014 Pialot ................... B29C 64/255
   427/551
2017/0165754 A1\* 6/2017 Buller ..................... B29C 64/35
2018/0079003 A1\* 3/2018 Lin ....................... B23K 26/046

\* cited by examiner

COMPOSITE DEVICE FOR HIGH-PRECISION LASER ADDITIVE/SUBTRACTIVE MANUFACTURING

FIELD OF THE INVENTION

The present invention belongs to the technical field of laser machining, particularly relates to a composite device for high-precision laser additive/subtractive manufacturing.

BACKGROUND OF THE INVENTION

Selective Laser Melting (SLM) is a laser additive manufacturing technology based on manufacturing physical parts by material discrete-gradual accumulation method, which uses high-power laser as heat source to melt metal powder layer by layer, and thus manufactures parts with complex and fine structure (high machining precision) directly. Such technology can realize fast and modeless near net shaping of dense materials with complex structures, and thus proposes new ideas for the integrated preparation of parts with complex and fine structure, especially provides a simple, fast, low-cost, and greening flexible manufacturing technology, which is accomplished from powder to entire parts for such industries as aeronautics and astronautics, medical equipment, precision machine tools, electronic and telecommunication, and has an excellent application prospect.

However, due to being subject to the influence of powder size, adhered powder and spheroidizing of powder, interlayer step effect, spot size of laser focusing, microcracks, and residual tensile stress and deformation caused by uneven heating, there is still a big gap between the complexity and fineness of SLM shaped parts, surface roughness, density and comprehensive mechanical properties and user expectation.

Therefore, it is of great significance to develop a technology which can address various problems of SLM shaped parts, such as low precision of geometric dimension, poor surface quality, strong residual tensile stress and existence of quite a lot of internal defects, and thus complete high-precision and integrated near net shaping.

SUMMARY OF THE INVENTION

The purpose of the present invention is to overcome the disadvantages of the prior art SLM shaped parts such as low precision of geometric dimension, poor surface quality, strong residual tensile stress and existence of quite a lot of internal defects, and thus provide a manufacturing equipment which can complete high-precision and integrated near net shaping.

In order to achieve the above purpose, the present invention provides the following technical scheme:

A composite device for high-precision laser additive/subtractive manufacturing, which consists of a sealed shaping chamber, an inert protective gas source and a machine-shaping platform, a light path selection system, as well as a control unit;

The said inert protective gas source is connected to the sealed shaping chamber to provide inert protective gas for the sealed shaping chamber;

The said machine-shaping platform is arranged in the said sealed shaping chamber, wherein the light path selection system is arranged above the said machine-shaping platform;

There is a machining position is equipped on the said machine-shaping platform, and there are lead screws are arranged under the machine-shaping platform. The machine-shaping platform is fixed on the sliding blocks of the lead screws, and the said lead screws are connected to the motor of lead screw, and thus the machine-shaping platform can slide forward and backward on the lead screws under the drive of the motor of lead screw;

The said light path selection system is arranged right above the machine-shaping platform, which consists of an independent laser light path for additive manufacturing and an independent laser light path for subtractive manufacturing which are parallel to each other, and arranged along the direction of lead screw, and each independent laser light path consists of a set of equipment including a laser, a beam expander, a scanning galvanometer and a focusing field lens, which are arranged in sequence, meanwhile, each independent laser light path does not share equipment;

The said control unit is respectively connected to the inert protective gas source, the motor of lead screw, the machine-shaping platform and the electrical signal of the light path selection system. The control unit can control the inert protective gas source to make the sealed shaping chamber full of inert protective gas, and then drive the motor of lead screw as per the requirement, and thus make the machine-shaping platform slide, so that guarantee the machining position to align at the required independent laser light path as well as control the light path selection system to machine the parts, and then, repeat such operation process until the parts are machined.

The composite device for high-precision laser additive/subtractive manufacturing of the present invention utilizes laser additive/subtractive manufacturing technology to complete composite manufacturing. Compared with traditional laser additive manufacturing, it can realize the functions of eliminating the step effect layer by layer, stripping excess materials such as the steps of sliced layers and adhering powder at the contour edges layer by layer, removing local materials in the selected area of the layer, and forming a continuous complex and fine cavity after overlapping layer-by-layer by synchronously adopting ultra-fast laser subtractive manufacturing technology, and thus can remove part of the supporting material simultaneously and effectively; The present invention organically integrates the selective laser melting technology and ultra-fast laser subtractive manufacturing technology, and thus realizes a kind of process route which can carry out two machining technologies simultaneously, so that improves the shaping precision and the surface quality of complex and fine additive-manufacturing parts, and overcomes the technical problem of being unable to carry out follow-up processing to the complex and fine parts with fine structures of enclosed cavities, deep grooves and holes, and multichannel capillary tubes, etc., and thus achieves one-stop near net shaping of high-efficiency, high-precision, and high-performance additive-manufacturing parts finally.

The device of the present invention adopts elaborate design, and each machining process is equipped with an independent laser light path. Compared with the frequently-used shared device (laser) adopted by the prior art, the present invention can not only significantly improve the machining precision, but also improve the stability of the light path through the independent laser light path, and thus can improve the stability of machining so that has great application prospects.

As a preferred technical scheme:

As for the composite device for high-precision laser additive/subtractive manufacturing as described above, the said independent laser light path for additive manufacturing consists of a laser for additive manufacturing, a beam expander of the light path for additive manufacturing, and a scanning galvanometer of the light path for additive manufacturing as well as a focusing field lens of the light path for additive manufacturing;

The said independent laser light path for subtractive manufacturing consists of a laser for subtractive manufacturing, a beam expander of the light path for subtractive manufacturing, and a scanning galvanometer of the light path for subtractive manufacturing as well as a focusing field lens of the light path for subtractive manufacturing.

As for the composite device for high-precision laser additive/subtractive manufacturing as described above, the said control unit is respectively connected to the laser for additive manufacturing and the laser for subtractive manufacturing.

During the machining process for laser additive manufacturing, the control unit controls the laser for additive manufacturing to output the laser beam, which is transferred to the corresponding machining position on the machine-shaping platform through the beam expander of the light path for additive manufacturing, the scanning galvanometer of the light path for additive manufacturing and the focusing field lens of the light path for additive manufacturing to complete the machining for additive manufacturing;

During the machining process for laser subtractive manufacturing, the control unit controls the laser for subtractive manufacturing to output the laser beam, which is transferred to the corresponding machining position on the machine-shaping platform through the beam expander of the light path for subtractive manufacturing, the scanning galvanometer of the light path for subtractive manufacturing and the focusing field lens of the light path for subtractive manufacturing to complete the machining for subtractive manufacturing;

As for the composite device for high-precision laser additive/subtractive manufacturing as described above, the laser beam emitted by the said laser for additive manufacturing is a continuous laser with a wavelength of 1064 nm and a power of 100-1000 W, furthermore, the spot diameter is 50-200 μm, and the scanning speed is 50-2000 mm/s;

The laser beam emitted by the said laser for subtractive manufacturing is a picosecond pulse laser beam or a femtosecond pulse laser beam;

The parameters of the picosecond pulse laser beam are: the pulse width is 13 ps, the frequency is 1-2 MHz, the power is 0-180 W, the scanning speed is 1-10 mm/s, and the wavelength is 1030 nm;

The parameters of the femtosecond pulse laser beam are: the pulse width is 190 fs-10 ps, the frequency is 1 kHz-1 MkHz, the power is 0-20 W, the scanning speed is 1-10 mm/s, and the wavelength is 1030 nm. Wherein, the power of the laser for subtractive manufacturing should to be selected as per actual process requirements. If the laser power selected is extremely high, it will cause the energy deficiency of laser spot, and thus causes obvious thermal effects so that influences the material performance. On the contrary, if the laser power selected is too low, the energy of laser spot will be too large, and thus cannot achieve the purpose of removing excess material on the surface and thus improving the surface quality. The parameters of the lasers emitted by various types of lasers described in the present invention are not limited to this, and those skilled in the art can adjust them to a certain extent as per actual processing requirements.

As for the composite device for high-precision laser additive/subtractive manufacturing as described above, the said machine-shaping platform consists of a machining platform surface, a shaping cylinder, a powder collection cylinder and a powder-spreading blade;

The said shaping cylinder and the powder collection cylinder are arranged on the said machining platform surface;

The shaping cylinder refers to the said machining position, and there is a substrate is arranged in the shaping cylinder, and the said substrate can move in the vertical direction;

The said sealed shaping chamber is equipped with a through hole which is connected to the outside, and there is a powder feeder, which is used to feed powder from the outside to the sealed shaping chamber, is arranged at the through hole;

The said powder-spreading blade is arranged above the said machining platform surface, which is used to spread the powder in the powder feeder on the substrate equipped in the shaping cylinder and push the residual powder into the powder collection cylinder.

As for the composite device for high-precision laser additive/subtractive manufacturing as described above, the said control unit is respectively connected to the powder-spreading blade, the feeder, the shaping cylinder and the powder cylinder.

As for the composite device for high-precision laser additive/subtractive manufacturing as described above, the said control unit is a computer.

As for the composite device for high-precision laser additive/subtractive manufacturing as described above, the operating steps of the said control unit are as follows:

(1) Obtain the 3D digital model of the part to be manufactured, and then use software (such as CAD software, CAM software and other model making software with similar functions) to slice and layer the 3D digital model of the part to be manufactured, and thus obtain the contour data of the layer sliced layer by layer, and generate the constitution parameters of the part to be manufactured, wherein, the said constitution parameters consist of machining parameters of laser additive manufacturing and machining parameters of laser subtractive manufacturing;

(2) Turn on the inert protective gas source to make the sealed shaping chamber under the protection of inert protective gas;

(3) Control the laser for additive manufacturing to start the laser additive machining of the parts to be manufactured at the machining position according to the parameters of additive machining; during the process of laser additive manufacturing, the powder feeder (the powder material in the powder feeder refers to the powder can be used to complete additive manufacturing by the selective laser melting, including but not limited to metal powder, ceramic powder, and mixed powder thereof), transports powder to the sealed shaping chamber, and the powder in the powder feeder is spread on the substrate of the shaping cylinder through the movement of powder-spreading blade, and then the laser beam is controlled to selectively melt the spread powder according to the slice information and constitution parameters, and solidify them to form a sliced layer of the part, i.e., complete the laser additive machining of one layer, after that, repeat the above steps until completing the laser additive machining of all n layers, i.e., complete the laser additive machining of the parts to be manufactured;

(4) After completing the laser additive machining of the parts to be manufactured, control the motor of lead screw to move the machining position right under the independent laser light path for subtractive manufacturing, and control the laser for subtractive manufacturing to perform ultra-fast pulse laser subtractive machining according to the parameters of laser subtractive machining, and then scan the contour edges of sliced layers of shaped n layers and/or the feature area where need to be processed into fine structures through subtractive machining as well as remove excess materials such as adhered powder and step effects;

(5) Repeat steps (3)-(4) until all the layers of the parts to be manufactured are machined, i.e., the machining process of the parts to be manufactured is completed.

As for the composite device for high-precision laser additive/subtractive manufacturing as described above, the roughness of the manufactured parts can reach up to Ra 6.3 µm, and the machining precision can reach up to 10 µm.

The benefits of the present invention are:

(1) The composite device for high-precision laser additive/subtractive manufacturing of the present invention can realize the functions of eliminating the step effect layer by layer, stripping excess materials such as the steps of sliced layers and adhering powder at the contour edges layer by layer, removing local materials in the selected area of the layer, and forming a continuous complex and fine cavity after overlapping layer-by-layer by synchronously adopting ultra-fast laser subtractive manufacturing technology during the process of laser additive/subtractive machining, and thus can remove part of the supporting material simultaneously and effectively;

(2) The composite device for high-precision laser additive/subtractive manufacturing of the present invention organically integrates the selective laser melting technology and ultra-fast laser subtractive manufacturing technology, and thus improves the shaping precision, the surface quality, the structure property and the state of residual stress of complex and fine additive-manufacturing parts, meanwhile, overcomes the technical problem of being unable to carry out follow-up processing to the complex and fine parts with fine structures of enclosed cavities, deep grooves and holes, and multichannel capillary tubes, etc., and thus realize a one-stop preparation of high-efficiency, high-precision, and high-performance additive-manufacturing parts finally. Furthermore, the result of being able to complete two processes in the same device simultaneously can significantly improve the processing efficiency and reduce the post-processing cost;

(3) The composite device for high-precision laser additive/subtractive manufacturing of the present invention adopts elaborate design, and each machining process is equipped with an independent laser light path. Compared with the frequently-used shared device (laser) adopted by the prior art, the present invention can not only significantly improve the machining precision, but also improve the stability of the light path through the independent laser light path, and thus can improve the stability of machining so that has great application prospects.

Wherein, 1 indicates inert protective gas source, 2 indicates sealed shaping chamber, 3 indicates powder feeder, 4 indicates focusing field lens of light path for additive manufacturing, 5 indicates scanning galvanometer of light path for additive manufacturing, 6 indicates beam expander of light path for additive manufacturing, 7 indicates laser for additive manufacturing, 8 scanning galvanometer of light path for subtractive manufacturing, 9 indicates focusing field lens of light path for subtractive manufacturing, 10 indicates beam expander of light path for subtractive manufacturing, 11 indicates laser for subtractive manufacturing, 12 indicates powder-spreading blade, 13 indicates shaping cylinder, 14 indicates substrate, 15 indicates parts to be manufactured, 16 indicates powder collection cylinder, 17 indicates sliding block, 18 indicates lead screw, 19 indicates motor of lead screw, 20 indicates control unit.

DESCRIPTION OF THE INVENTION

The text below will further illustrate the specific embodiments of the present invention in conjunction with the drawings, wherein, the manufacture of 316 stainless steel capillary tube will be taken as an example.

Figure 1:
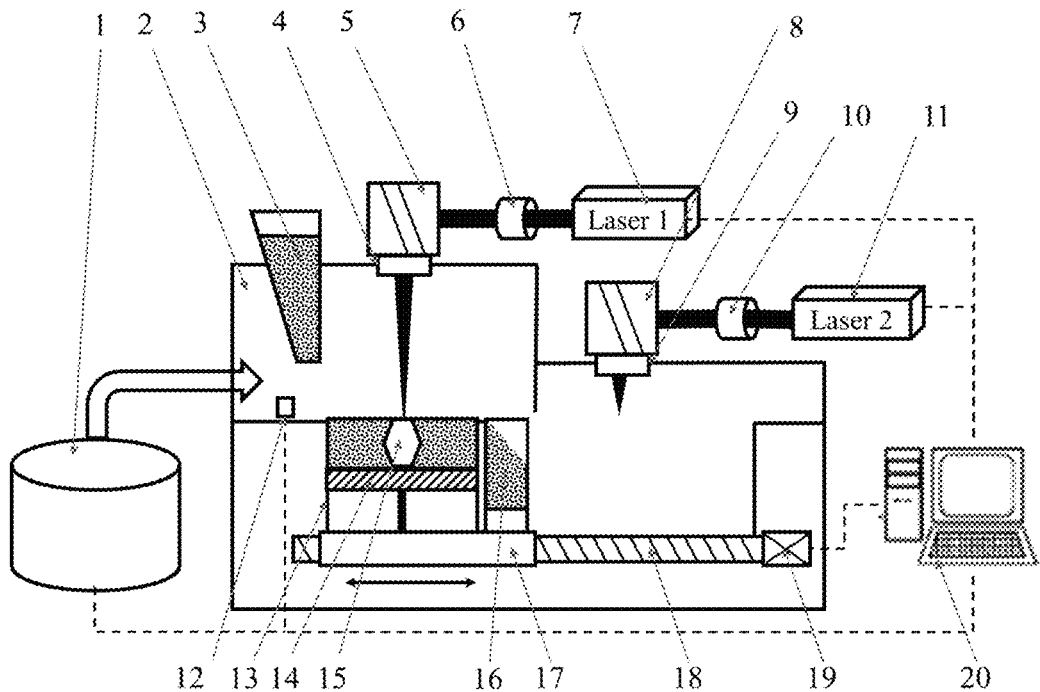
FIG. 1 is a schematic diagram of the composite device for high-precision laser additive/subtractive manufacturing of the present invention.

A composite device for high-precision laser additive/subtractive manufacturing as shown in FIG. 1, which consists of a sealed shaping chamber 2, an inert protective gas source 1 and a machine-shaping platform, a light path selection system, as well as a control unit 20 (computer);

The inert protective gas source 1 is connected to the sealed shaping chamber 2 to provide inert protective gas for the sealed shaping chamber 2;

The machine-shaping platform is arranged in the sealed shaping chamber 2, wherein the light path selection system is arranged above the machine-shaping platform, and the sealed shaping chamber 2 is equipped with a through hole which is connected to the outside, and there is a powder feeder 3, which is used to feed powder from the outside to the sealed shaping chamber, is arranged at the through hole;

The machine-shaping platform consists of a machining platform surface, a shaping cylinder 13 (machining position), a powder collection cylinder 16 and a powder-spreading blade 12, wherein, the shaping cylinder 13 and the powder collection cylinder 16 are arranged on the machining platform surface, and there is a substrate 14 is arranged in the shaping cylinder 13, which can move in the vertical direction, in addition, the powder-spreading blade 12 is arranged above the machining platform surface, which is used to spread the powder in the powder feeder 3 on the substrate 14 equipped in the shaping cylinder and push the residual powder into the powder collection cylinder 16;

There are lead screws 18 are arranged under the machine-shaping platform, and the machine-shaping platform is fixed on the sliding blocks 17 of the lead screws 18, as well as the lead screws 18 are connected to the motor of lead screw 19, and thus the machine-shaping platform can slide forward and backward on the lead screws 18 under the drive of the motor of lead screw 19;

The light path selection system is arranged right above the machine-shaping platform, which consists of an independent laser light path for additive manufacturing and an independent laser light path for subtractive manufacturing which are parallel to each other, and arranged along the direction of lead screw, wherein, the independent laser light path for additive manufacturing consists of a laser for additive manufacturing 7, a beam expander of the light path for additive manufacturing 6, and a scanning galvanometer of the light path for additive manufacturing 5 as well as a focusing field lens of the light path for additive manufacturing 4, meanwhile, the independent laser light path for subtractive manufacturing consists of a laser for subtractive manufacturing 11, a beam expander of the light path for subtractive manufacturing 10, and a scanning galvanometer of the light path for subtractive manufacturing 8 as well as a focusing field lens of the light path for subtractive manufacturing 9.

Figure 2:
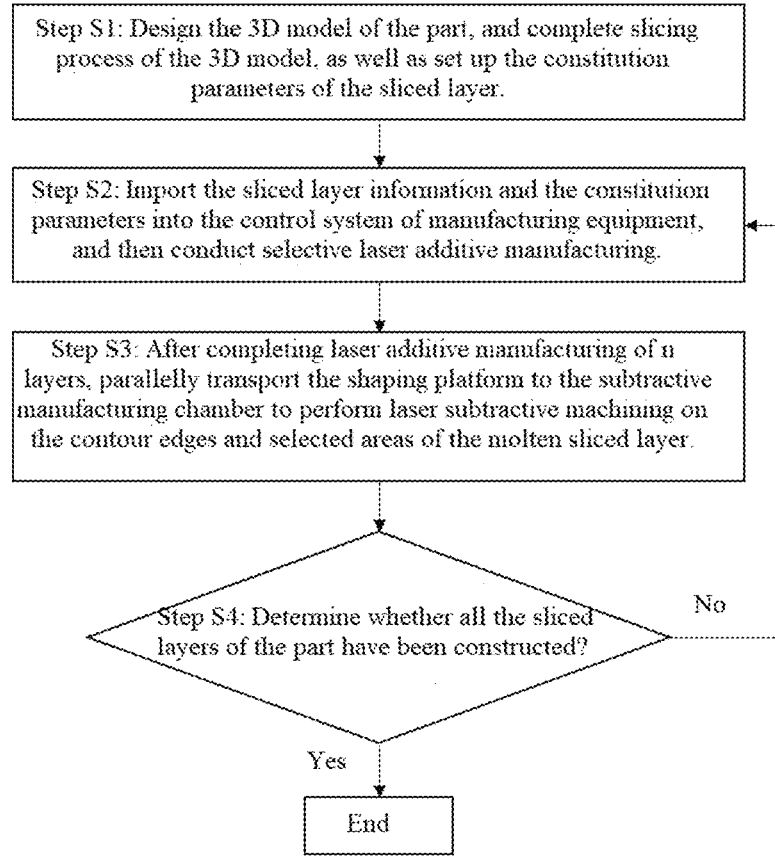
FIG. 2 is a control flow chart of the control unit of the present invention.
Figure 3:
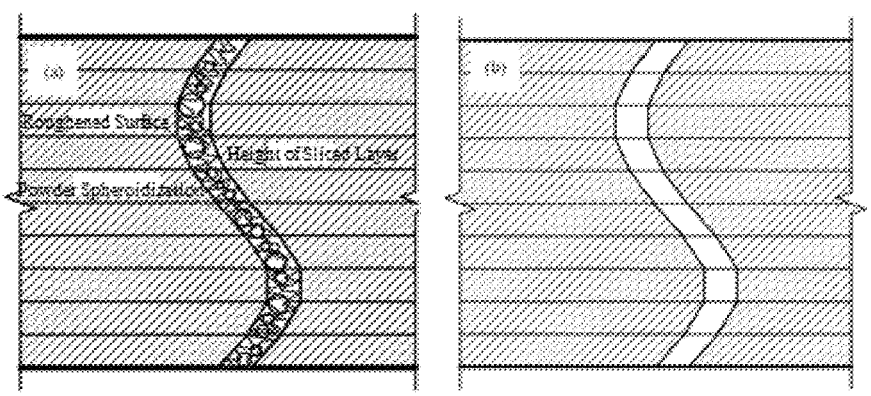
FIG. 3 is a comparison schematic diagram of the section views of entities of the 316 stainless steel capillary tube (a) obtained by the traditional selective laser melting and shaping technology and the 316 stainless steel capillary tube (b) obtained by the device of the present invention.

Wherein, the laser beam emitted by the laser for additive manufacturing is a continuous laser with a wavelength of 1064 nm and a power of 100-1000 W, furthermore, the spot diameter is 50-200 μm, and the scanning speed is 50-2000 mm/s;

The laser beam emitted by the laser for subtractive manufacturing is a picosecond pulse laser beam or a femtosecond pulse laser beam;

The parameters of the picosecond pulse laser beam are: the pulse width is 13 ps, the frequency is 1-2 MHz, the power is 0-180 W, the scanning speed is 1-10 mm/s, and the wavelength is 1030 nm;

The parameters of the femtosecond pulse laser beam are: the pulse width is 190 fs-10 ps, the frequency is 1 kHz-1 MkHz, the power is 0-20 W, the scanning speed is 1-10 mm/s, and the wavelength is 1030 nm;

The control unit 20 is respectively connected to the inert protective gas source 1, the powder feeder 3, the powder-spreading blade 12, the motor of lead screw 19, the shaping cylinder 13, the laser for additive manufacturing 7 and the laser for subtractive manufacturing 11 through electrical signal. The control unit can control the inert protective gas source to make the sealed shaping chamber full of inert protective gas, and then drive the motor of lead screw as per the requirement, and thus make the machine-shaping platform slide, so that guarantee the machining position to align at the required independent laser light path as well as control the light path selection system to machine the parts, and then, repeat such operation process until the parts are machined;

Wherein, the specific steps of machining parts by the control unit are shown in FIG. 2, and the details are as follows:

(1) Obtain the 3D digital model of the part to be manufactured (i.e., the 316 stainless steel capillary tube), and then CAD software and CAM software to slice and layer the 3D digital model of the part to be manufactured, and thus obtain the contour data of the layer sliced layer by layer, and generate the constitution parameters of the part to be manufactured, wherein, the constitution parameters consist of machining parameters of laser additive manufacturing and machining parameters of laser subtractive manufacturing;

(2) Turn on the inert protective gas source to make the sealed shaping chamber under the protection of inert protective gas;

(3) Control the laser for additive manufacturing to start the laser additive machining of the parts to be manufactured at the machining position according to the parameters of additive machining, wherein, the powder in the powder feeder selects a sub-spheroidal 316 stainless steel powder with a particle size of 15-53 μm, and the specific process of laser additive machining is: the powder feeder 3 transports powder to the sealed shaping chamber 2, and the powder in the powder feeder 3 is spread on the substrate of the shaping cylinder 14 through the movement of powder-spreading blade 12, and then the laser beam is controlled to selectively melt the spread powder according to the slice information and constitution parameters, and solidify them to form a sliced layer of the part, i.e., complete the laser additive machining of one layer, after that, repeat the above steps until completing the laser additive machining of all n layers, after constructing 2-5 sliced layers, turn off the laser for additive manufacturing 7;

(4) After completing the laser additive machining of the parts to be manufactured, control the motor of lead screw 19 to move the machining position right under the independent laser light path for subtractive manufacturing, and control the laser for subtractive manufacturing to perform ultra-fast pulse laser subtractive machining according to the parameters of laser subtractive machining, furthermore, the specific process of laser subtractive machining is: scan the contour edges of the cladding layer on the substrate 14 or the selected feature area where need to be processed into fine structures through subtractive machining for subtractive manufacturing (the fine structure mentioned herein includes cavities, deep grooves, deep holes and complex capillary tubes inside the parts), and the number of scan is 1-2 times, after that, eliminate the excess material of the contour edge and selected feature area, and thus, improve the surface quality and dimensional precision of the part, so that realize the shaping of the fine structure of the part;

(5) Repeat steps (3)-(4) until all the layers of the parts to be manufactured are machined, i.e., the machining process of the parts to be manufactured is completed, and the section view of the shaped 316 stainless steel capillary tube is shown in FIG. 3b;

The roughness of the manufactured 316 stainless steel capillary tube can reach up to Ra 6.3 μm, and the machining precision can reach up to 10 After comparing with the 316 stainless steel capillary tube manufactured through traditional selective laser melting technology, it can be found that the 316 stainless steel capillary tube manufactured by the device of the present invention has no residual powder spheroidization and with good smoothness, meanwhile, the product quality is much better than that of the 316 stainless steel capillary tube manufactured through traditional selective laser melting technology (as shown in FIG. 3a). The device of the present invention can improve the machining precision and the surface quality of the parts, and the internal structure of the product is dense, and thus can effectively inhibit the formation of residual tensile stress, so that significantly improve the comprehensive mechanical properties of the product.

It has been verified that the composite device for high-precision laser additive/subtractive manufacturing of the present invention can realize the functions of eliminating the step effect layer by layer, stripping excess materials such as the steps of sliced layers and adhering powder at the contour edges layer by layer, removing local materials in the selected area of the layer, and forming a continuous complex and fine cavity after overlapping layer-by-layer by synchronously adopting ultra-fast laser subtractive manufacturing technology during the process of laser additive/subtractive machining, and thus can remove part of the supporting material simultaneously and effectively; such composite device organically integrates the selective laser melting technology and ultra-fast laser subtractive manufacturing technology, and thus improves the shaping precision, the surface quality, the structure property and the state of residual stress of complex and fine additive-manufacturing parts, meanwhile, overcomes the technical problem of being unable to carry out follow-up processing to the complex and fine parts with fine structures of enclosed cavities, deep grooves and holes, and multichannel capillary tubes, etc., and thus realize a one-stop preparation of high-efficiency, high-precision, and high-performance additive-manufacturing parts finally. Furthermore, the result of being able to complete two processes in the same device simultaneously can significantly improve the processing efficiency and reduce the post-processing cost; in addition, the present invention adopts elaborate design, and each machining process is equipped with an independent laser light path. Compared with the frequently-used shared device (laser) adopted by the prior art, the present invention can not only significantly improve the machining precision, but also improve the stability of the light path through the independent laser light path, and thus can improve the stability of machining so that has great application prospects.

Although the specific embodiments of the present invention are described above, for those technical staff in the art should understand that these are only illustrations, and various variations or modifications can be made to these embodiments without departing from the principle and essence of the present invention.

The invention claimed is:

1. A composite device for high-precision laser additive/subtractive manufacturing, consisting of
    a sealed shaping chamber,
    an inert protective gas source,
    a machine-shaping platform,
    a light path selection system, and
    a control unit;
    wherein the inert protective gas source is connected to the sealed shaping chamber to provide inert protective gas for the sealed shaping chamber;
    the machine-shaping platform is arranged in the sealed shaping chamber, wherein the light path selection system is arranged above the machine-shaping platform;
    the machine-shaping platform includes lead screws and a motor arranged under the machine-shaping platform;
    the machine-shaping platform is fixed on sliding blocks of the lead screws, and the lead screws are connected to the motor, and thus the machine-shaping platform can slide forward and backward on the lead screws by driving the motor;
    the light path selection system is arranged right above the machine-shaping platform, and the light path selection system consists of an independent laser light path for additive manufacturing and an independent laser light path for subtractive manufacturing, and the light path selection system is arranged along a direction of lead screws, and each of the independent laser light path for additive manufacturing and the independent laser light path for subtractive manufacturing consists of a set of equipment including a laser, a beam expander, a scanning galvanometer and a focusing field lens, which are arranged in sequence, meanwhile, each independent laser light path does not share equipment;
    the control unit is respectively connected to the inert protective gas source, the motor, the machine-shaping platform and the light path selection system through electrical signal;
    the control unit can control the inert protective gas source to make the sealed shaping chamber full of inert protective gas, and then drive the motor, and thus make the machine-shaping platform slide.

2. The composite device for high-precision laser additive/subtractive manufacturing according to claim 1, wherein
    the independent laser light path for additive manufacturing consists of the laser for additive manufacturing, the beam expander of the light path for additive manufacturing, the scanning galvanometer of the light path for additive manufacturing, and the focusing field lens of the light path for additive manufacturing;
    the independent laser light path for subtractive manufacturing consists of a laser for subtractive manufacturing, a beam expander of the light path for subtractive manufacturing, a scanning galvanometer of the light path for subtractive manufacturing, and a focusing field lens of the light path for subtractive manufacturing.

3. The composite device for high-precision laser additive/subtractive manufacturing according to claim 2, wherein the control unit is respectively connected to the laser for additive manufacturing and the laser for subtractive manufacturing.

4. The composite device for high-precision laser additive/subtractive manufacturing according to claim 2, wherein
    a laser beam emitted by the laser for additive manufacturing is a continuous laser with a wavelength of 1064 nm and a power of 100-1000 W, furthermore, a spot diameter is 50-200 μm, and a scanning speed is 50-2000 mm/s;
    a laser beam emitted by the laser for subtractive manufacturing is a picosecond pulse laser beam or a femtosecond pulse laser beam; parameters of the picosecond pulse laser beam are: a pulse width is 13 ps, a frequency is 1-2 MHz, a power is 0-180 W, a scanning speed is 1-10 mm/s, and a wavelength is 1030 nm; parameters of the femtosecond pulse laser beam are: a pulse width is 190 fs-10 ps, a frequency is 1 kHz-1 MkHz, a power is 0-20 W, a scanning speed is 1-10 mm/s, and a wavelength is 1030 nm.

5. The composite device for high-precision laser additive/subtractive manufacturing according to claim 1, wherein
    the machine-shaping platform consists of a machining platform surface, a shaping cylinder, a powder collection cylinder and a powder-spreading blade;
    the shaping cylinder and the powder collection cylinder are arranged on the machining platform surface;
    the shaping cylinder refers to the machining position, and a substrate is arranged in the shaping cylinder, and the substrate can move in a vertical direction;
    the sealed shaping chamber is equipped with a through hole which is connected to an outside of the sealed shaping chamber, and a powder feeder, which is used to feed powder from the outside of the sealed shaping chamber into the sealed shaping chamber, is arranged at the through hole;
    the powder-spreading blade is arranged above the machining platform surface, which is used to spread powder in the powder feeder on the substrate equipped in the shaping cylinder and push residual powder into the powder collection cylinder.

6. The composite device for high-precision laser additive/subtractive manufacturing according to claim 5, wherein the control unit is respectively connected to the powder-spreading blade, the feeder, the shaping cylinder and the powder cylinder.

7. The composite device for high-precision laser additive/subtractive manufacturing according to claim 1, wherein the control unit is a computer.

* * * * *